(12) United States Patent
Shinnar et al.

(10) Patent No.: US 7,607,125 B2
(45) Date of Patent: Oct. 20, 2009

(54) PROGRAMMING LANGUAGE SUPPORT FOR INTEGRATING UNDO AND EXCEPTION HANDLING

(75) Inventors: Avraham E. Shinnar, New Rochelle, NY (US); David Read Tarditi, Jr., Kirkland, WA (US); Bjarne Steensgaard, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 626 days.

(21) Appl. No.: 10/985,353

(22) Filed: Nov. 11, 2004

(65) Prior Publication Data

US 2006/0101420 A1 May 11, 2006

(51) Int. Cl.
G06F 9/45 (2006.01)
G06F 9/44 (2006.01)

(52) U.S. Cl. .............. 717/140; 717/106; 717/116; 717/117; 717/151

(58) Field of Classification Search ............ None
See application file for complete search history.

(56) References Cited

U.S. PATENT DOCUMENTS

| | | | |
|---|---|---|---|
| 5,890,161 A | 3/1999 | Helland et al. | |
| 5,958,004 A | 9/1999 | Helland et al. | |
| 6,526,416 B1 | 2/2003 | Long | |
| 6,543,006 B1 * | 4/2003 | Zundel et al. | 714/19 |
| 6,618,851 B1 * | 9/2003 | Zundel et al. | 717/103 |
| 6,728,879 B1 | 4/2004 | Atkinson | |

OTHER PUBLICATIONS

Fetzer et al., "Automatic Detection and Masking of Nonatomic Exception Handling", Aug. 2004, IEEE, pp. 547-560 (from the IDS).*
Algis Rudys, "Termination and Rollback in Language-Based Systems", Dec. 2002, Rice University, Houston, Texas, pp. 1-93.*
Shinnar et al., "Integrating support for undo with exception handling", Dec. 2004, Microsoft Research, pp. 1-13.*
Hagen et al., "Exception Handling in Workflow Management Systems", 2000, IEEE, pp. 943-958.*
Tim Harris, "Exceptions and side-effects in atomic blocks", Jul. 25, 2004, In PODC Workshop on Con-currency and Synchronization in Java Programs (CSJP 2004), pp. 1-7.*
Tim Harris, "Design choics for language-based transactions", Aug. 2003, Technical report, Computer Lab Technical Report 572, pp. 1-7.*
Harris et al., "Language Support for Lightweigh Transactions", Oct. 26, 2003, ACM, pp. 1-15.*

(Continued)

Primary Examiner—Michael J. Yigdall
Assistant Examiner—Ben C Wang
(74) Attorney, Agent, or Firm—Klarquist Sparkman, LLP

(57) ABSTRACT

Existing methods for returning program state to a previous state are often too heavy weight. Often these methods attempt to guarantee a series of properties to a programmer across a distributed environment or multiple threads. Instead, a program state reversion mechanism provides a light weight and efficient runtime solution for general purpose programming languages. For example, a series of program statements (e.g., methods, instructions, etc.) are indicated by a programmer in a state reversion language construct, such as a TryAll block. If an exception is thrown anywhere from within the TryAll block, the program is reverted to the pre-TryAll block state.

22 Claims, 9 Drawing Sheets

OTHER PUBLICATIONS

U.S. Appl. No. 10/650,245, filed Aug. 27, 2003, Grieskamp et al.

Produced by ECMA TC39/TG3, "Common Language Infrastructure (CLI) Partition III: CIL Instruction Set", Final draft—Oct. 2002, 130 pages.

Barbara Liskov and Robert Scheifler, "*Guardians and Actions: Linguistic Support for Robust, Distributed Programs*", ACM Transactions on Programming Languages and Systems (TOPLAS), vol. 5, No. 3, Jul. 1983, pp. 381-404.

David L. Detlefs, Maurice P. Herlihy, and Jeannette M. Wing, "*Inheritance of Synchronization and Recovery Properties in Avalon/C++*", IEEE Computer, vol. 21, No. 12, Dec. 1988, pp. 57-69.

Nicholas Haines, Darrell Kindred, J. Gregory Morrisett, Scott M. Nettles and Jeannette M. Wing, "*Composing First-Class Transactions*", ACM Transactions on Programming Languages and Systems, Short Communication, Nov. 1994, 18 pages.

Jeannette M. Wing, Manuel Faehndrich, J. Gregory Morrisett, and Scott Nettles, "*Extensions to Standard ML to Support Transactions*", ACM SIGPLAN Workshop on ML and its Applications, Jun. 1992, 15 pages.

Scott M. Nettles and Jeannette M. Wing, "*Persistence+Undoability=Transactions*", Proc. of Hawaii International Conference on Systems Science 25, Jan. 1991, 12 pages.

George B. Leeman Jr., "*A Formal Approach to Undo Operations in Programming Languages*", ACM Transactions on Programming Languages and Systems, vol. 8, No. 1, Jan. 1986, pp. 50-87.

Ralph E. Griswold, David R. Hanson, and John T. Korb, "*Generators in Icon*", ACM Transactions on Programming Languages and Systems, vol. 3, No. 2, Apr. 1981, pp. 144-161.

Christof Fetzer and Karin Hogstedt, "*Automatic Detection and Masking of Nonatomic Exception Handling*", IEEE Transactions on Software Engineering, Aug. 2004, pp. 547-560.

Brian Randell, Alexander Romanovsky, Cecelia M.F. Rubira, Robert J. Stroud, Zhixue Wu, and Jie Xu, "*From Recovery Blocks to Concurrent Atomic Actions" Predictably Dependable Computing System*, 1995, 19 pages.

J.J. Horning, H.C. Lauer, P.M. Melliar-Smith, and B. Randell, "*A Program Structure for Error Detection and Recovery*", Proceedings of the International Symposium on Operating Systems: Theoretical and Practical Aspects, Apr. 1974, 17 pages.

P.M. Melliar-Smith and B. Randell, "*Software Reliability: The Role of Programmed Exception Handling*", Proceedings of the ACM Conference on Language Design for Reliable Software, 1977, ACM SIGPLAN Notices, vol. 12, No. 3, pp. 95-100.

Flaviu Cristian, "*A Recovery Mechanism for Modular Software*", Proceedings of the 4th International Conference on Software Engineering, © 1979 IEEE, pp. 42-50A.

Antony L. Hosking, J. Eliot B. Moss, and Cynthia Bliss, "*Design of an Object Faulting Persistent Smalltalk*", Coins Technical Report 90-45, May 1990, 18 pages.

Antony L. Hosking and J. Eliot B. Moss, "*Towards Compile-Time Optimisations for Persistence*", Proceedings of the Fourth International Workshop on Persistent Object Systems, Sep. 1990, 11 pages.

Antony L. Hosking, Eric W. Brown, and J. Eliot B. Moss, "*Update Logging for Persistent Programming Languages: A Comparative Performance Evaluation*", Proceedings of the Nineteenth International Conference on Very Large Data Bases, Aug. 1993, 12 pages.

\* cited by examiner

```
TryAll
{
```

Try_All Block
518

```
} catch (ex) {              ← 602
    Exception newEx = ex.internalCloneForUndo ( );
    abortTryAll;            ← 604
    throw newEx;            ← 608
}
```

600

606

```
[NoRecordingForUndo]  ← 704
internalCloneForUndo (Exception exp) {  ← 702
   try {
      return ex.cloneForUndo ( );  ← 706
   } catch (Exception ex) {
      return ex;
   }
}
```

PROGRAMMING LANGUAGE SUPPORT FOR INTEGRATING UNDO AND EXCEPTION HANDLING

TECHNICAL FIELD

The technical field relates generally to returning computer program state to a previous state upon some event, and more specifically, to providing reversion language constructs and an efficient state reversion mechanism for general purpose programming applications.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Computer programs often rely on maintaining a set of invariants of the program state. When updating program state, the invariants are often temporarily violated. It is important that any attempted change of program state that temporarily violates the invariants either ensures that the resulting change maintains the invariants or ensures that the attempted change is completely undone.

Methods exist for returning program state to a previous state. Often these methods attempt to guarantee a series of properties to a programmer across a distributed environment or multiple threads. Typically, these solutions reduce runtime efficiency beyond those desirable for many applications, especially general purpose solutions. What is needed is program state reversion with a light weight and efficient runtime solution for general purpose programming languages.

SUMMARY

The described technologies provide methods and systems for allowing an application programmer to indicate a series of instructions for program state reversion upon a certain event. The following summary describes a few of the features described in the detailed description, but is not intended to summarize the technology.

Method and systems are provided for reverting changes made to the program state (e.g., memory) of a running program. A programmer indicates via programming constructs, one or more statements whose effect on program state should be reverted upon an exception. For example, a series of program statements (e.g., methods, instructions, etc.) are indicated in a state reversion language construct. In one such example, the reversion construct is a TryAll block. If an exception is thrown anywhere from within the TryAll block, the program state is reverted to its state before entering the TryAll block. The exception can be thrown by the programmer after testing for some condition, or the exception can be thrown for any other reason. The thrown exception causes an automatic program state reversion.

In another example, an undo action can be registered on non-memory resource objects, and an automatic program state reversion will call the undo action on the object once the program state has sequentially reverted to the state it was in when the undo action was registered. Once program state has reverted to the pre-TryAll block state, the program continues.

If desirable, thrown exceptions can be handled as anticipated by a programmer using a catch handler. An exception can be cloned before program state reversion, so the exception can be propagated outside the TryAll block. A TryAll block can be nested within another TryAll block, and each TryAll block will revert program state within its scope. Objects, statements and functions (e.g., functions) within a TryAll block are modified to keep a record of any program state changes, so pre-TryAll block values and references are available during reversion.

Additional features and advantages will be made apparent from the following detailed description, which proceeds with reference to the accompanying drawings.

DETAILED DESCRIPTION

Overview

Method and systems are provided for reverting changes made to the program state of a running program. A programmer indicates statements that should be reverted using a TryAll block. If an exception reaches the scope of the TryAll block, program state is reverted to the state it was in before entering the TryAll block. The exception can be thrown by the programmer after testing for some condition, or the exception can be thrown for any other reason. The thrown exception causes an automatic program state reversion. An undo action can be registered by non-memory resource objects, and the automatic program state reversion will call the undo action on the object once the program state has been reverted to the state it was in when the undo action was registered. Once the undo action has been performed, the reversal process is resumed, reversing program state and performing undo actions until all recorded program state changes and undo actions for the TryAll block have been processed. Once program state has reverted to the pre-TryAll block state, the program continues. Thrown exceptions can be handled as anticipated by a programmer using a catch handler. An exception can be cloned before program state reversion so the information about the exception is not reverted but is instead propagated up to indicate information about the state that caused the exception. TryAll blocks can be nested within each other, and each TryAll block reverts program state within its scope when requested. Objects, statements and functions within a TryAll block are modified to record any state changes to program state, so pre-TryAll block values and references can be restored during reversion.

In one example, code modification is provided via a compiler, which may be a just-in-time (JIT) or ahead-of-time compiler, and recording data structures are supported with automatic memory management (e.g. garbage collection).

Exemplary Program State Reversion Method

Figure 1:
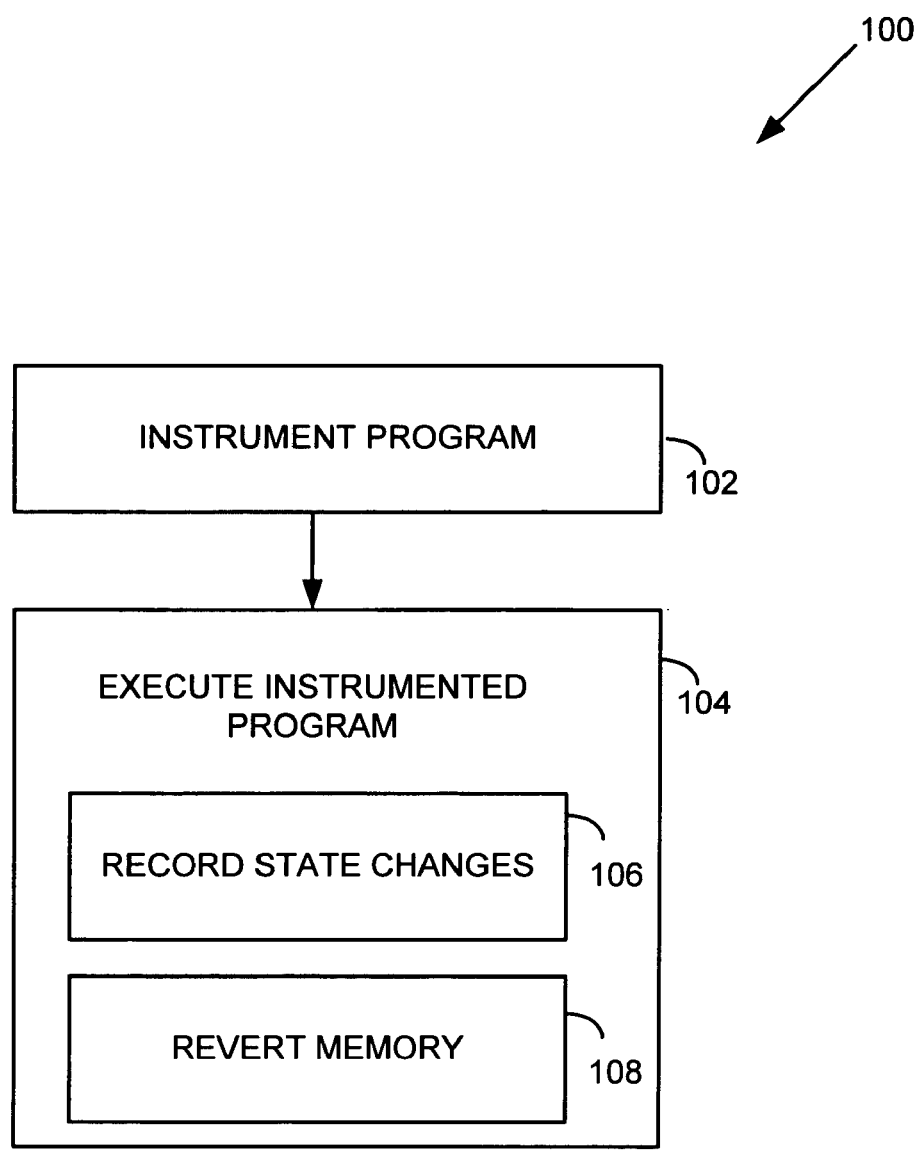
FIG. 1 is a flowchart of an exemplary method for performing program state reversion.

FIG. 1 is a flowchart of an exemplary method for performing program state reversion.

At 102, a method receives a program representation (e.g., a program listing such as source code, intermediate language code, object code, etc., hereafter called "program listing" or "program representation") comprising indicated instructions for performing program state reversion. For example, one or more instructions are indicated via a TryAll block. In one example, the method inserts recording code saving changes made to program state. The method identifies statements (e.g., instructions, function calls, methods, etc.) that change program state, and then inserts recording code in front of the instructions that change program state. The recording code records the state of the program state before the change so it can be replaced upon reversion. Additionally, the method inserts commitTryAll function calls anywhere in the program listing where the program execution exits the TryAll block without requiring reversion (e.g., without throwing an exception). The method also inserts abortTryAll function calls in the program listing to revert program state if an exception is thrown from a TryAll block.

At 104, the instrumented program executes.

While the instrumented program executes, when instrumented instructions are executed, the inserted recording functions establish recorded state 106 before program state changes are made. In one example, recording statements save state in plural arrays according to the type of state being saved. In another example, the recording statements save state in plural linked lists according to the type of state being saved. In another example, the recording statements save state in linked lists of arrays, where each linked list of arrays represents a type of state being saved. For example, an array and data structure is provided for saving changes made to the heap, and another array and data structure is provided for saving changes made to non-heap memory (e.g., stack, global static, etc.) Later, a method providing four separate linked lists of arrays is discussed.

While the instrumented program executes, and after recording statements save state, when the program throws an exception from the indicated instructions, the inserted instructions revert the program state 108 to a prior state. In one example, an abortTryAll function is called when an exception is thrown from a TryAll block. The abortTryAll function writes the recorded state back into the state of the program. The program then resumes execution in the pre-TryAll state, but at an execution location after the TryAll block (e.g., a "finally" instruction).

In one example, the recording statements save state changes sequentially. However, this is not required. In other examples, it is valuable to save state in a non-sequential manner. For example, a "write-once" map records only the original value or reference. In one such example, the write-once map is stored using a tree data structure.

Exemplary Reversion System

Figure 2:
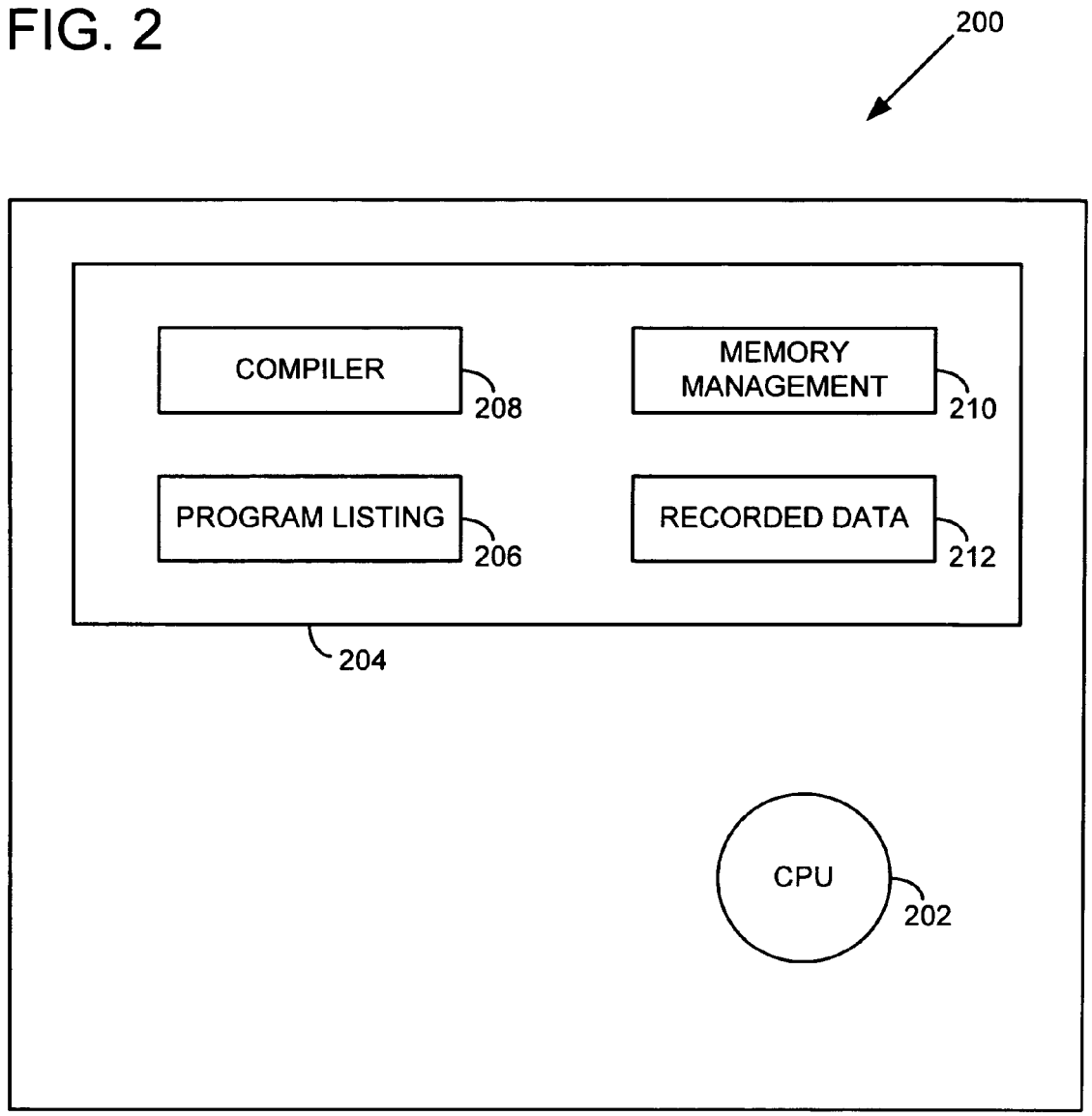
FIG. 2 is a block diagram of an exemplary system for providing program state reversion in a general purpose programming language.

FIG. 2 is a block diagram of an exemplary system for providing program state reversion in a general purpose programming language.

The computer system 200 includes a central processing unit (CPU) 202 and memory 204. The memory includes a program listing 206, a compiler 208, a memory management component 210, and a recorded data component(s) 212.

The compiler receives the program listing and identifies program statements indicated for potential program state reversal. The compiler inserts program state recording statements in the program listing so that the old program state is recorded before the indicated statements change the program state. The compiler also inserts program state reversion function calls into the program listing to revert the program state whenever an exception is thrown from statements indicated for potential program state reversal.

The computer system then executes the program listing as modified by the compiler 208. As the program executes, the recording instructions save old program state in the recorded data 212. During execution, if an exception is thrown from statements indicated for potential program state reversal, a program state reversal method 210 restores the old program state.

In one example, the program listing is received by a compiler in source code and the instrumented instructions are added to the generated code. The generated code is typically executable code. In another example, the program listing is received by the compiler in byte code. In such an example, the byte code is translated into instrumented code. In one such example, the compiler is a just-in-time compiler (JIT compiler).

Exemplary Reversion Semantics

Table A is a code section of an exemplary program state reversion program construct.

TABLE A

TryAll {
   S1;
   S2;
   S3;
}
S4;

In this example, if an exception is thrown and not handled within the TryAll scope (e.g., S1, S2, S3), then upon exiting the TryAll scope, the state of the program would be put back into the state it was entering the TryAll scope. Once the state changes were "undone", execution would resume at the statement after the TryAll scope (e.g., S4). Other names could be assigned to this reversion functionality.

TABLE B

TryAll { S1; S2;
} catch {
}
finally
}

In Table B, the catch runs within the scope of the TryAll block, so the catch runs before program state is reverted, and the finally runs after program state is reverted. Thus, if an exception is thrown within the TryAll, the catch handler is run on the exception, then the program state is reverted to the state it was in prior to entering the TryAll block. In another example, an alternative semantic is provided for the TryAll block. In such an alternative semantic, state reversal would not be performed if the catch statement caught the exception and did not rethrow the exception.

Table C is an exemplary Undo interface.

TABLE C

```
Iundo {
    Void undo ( );
}
```

The Iundo interface is provided to a programmer (e.g., user) for undoing resource changes (e.g., system calls) that cannot be done by simply restoring the object graph and non-reference values. For example, in Table D the programmer registers for an undo action inside a TryAll block.

TABLE D

```
TryAll {
    S1;
    registerForUndo (undoAction);
    S2;
}
```

In this example, an object that implements the Iundo interface is registered so the undo action is called on the registered object if the TryAll block is aborted. This register for undo function does not revert program state since that is already being performed by the TryAll functionality, but it makes systems calls and other resource management function calls needed to undo a change to a non-memory resource.

In one example, a registered object implementing the Iundo interface will have the undo action called upon it when the TryAll program state reversion has reverted to the state immediately before the undo was registered. In Table D, the undo method will be called on the registered resource when the TryAll reversion has incrementally returned the program state to what it was at the end of the S1 statement.

For example, a registered system call might be to a library or other system resource that supports the concept of an undo. Thus, the Iundo interface provides a way for a programmer to define an undo action on a resource (e.g., system state), and have the registered undo action called on the resource during a TryAll abort. Thus, the described technology does not limit the undo functionality to the program state state, but provides an undo registration for integrating a programmer preferred undo on external resources.

This provides a level of interoperability between internally managed program state resources and any external resource. Additionally, the undo interface provides a way to interact with external resources with their own form of state recovery (e.g., transaction processing). Thus, a file system resource supporting transaction processing could register an undo action to signal that file system to abort a transaction. Thus, the Iundo interface provides a way to support reversion on a resource with external state.

It is contemplated that an exception may arise when a registered undo action is called on a resource. Since the registered object has a programmer undo action implemented, an unknown exception may arise during the execution of the undo action. In one example, such an exception is simply ignored. In an alternate example, information about any exception thrown by undo actions is optionally displayed on the terminal. In an alternative example, the exceptions thrown by undo actions are aggregated and propagated by an exception thrown from the TryAll block.

Table E is an exemplary method used by a programmer to determine whether a statement location is in a TryAll block (or a nested TryAll block).

TABLE E

```
bool inTryAll( );
```

For example, a library programmer might be buffering information in case an undo function is called on a Iundo object registered (e.g., registerForUndo) by the library. If a present library call is not in a TryAll context, then the buffered information can be released. The in TryAll method allows the library programmer to determine whether or not the present instruction pointer is in a TryAll context.

Often it is useful for a programmer to know why a TryAll block was aborted causing program state to revert. However, upon exiting a TryAll abort, the program state has already been reverted, and the state of the exception causing the abort would likely be lost in the program state reversion. Thus, the exception is cloned before the reversion.

Table F is an example of a function that clones an exception before program state is reverted.

TABLE F

```
void CloneForUndo(exp);
```

The cloneForUndo function receives the old exception object and makes a new exception object. A default exception cloning method is provided and/or a programmer can be allowed to override the default and provide their own clone for an exception.

In one example, the cloneForUndo is not considered part of the existing aborted TryAll block. Therefore, the cloned exception will include the copied information, and the copied exception will propagate out of the TryAll context. However, since TryAll blocks can be nested within each other, the new/cloned exception could be reverted by an outer TryAll block.

Another problem occurs when a programmer wants to create a log of errors in a program. Without an extra mechanism, this would not be possible in general since an existing TryAll context would remove the exception information. Notice that when a TryAll block exits gracefully without abort, that does not mean the changes cannot revert. For example, if a nested TryAll commits but the outer TryAll aborts, all the state in the inner TryAlls are reverted. A simple attempt to keep a log of aborted TryAll blocks would be defeated by program state reversal caused by enclosing TryAll contexts. Thus, there is a possibility that a programmer would like to identify one or more statements, functions or classes about which a programmer wants errors or other information logged.

Table G is an example of an attribute that a programmer utilizes to allow program state changes to persist a reversion.

TABLE G

```
[NoRecordingForUndo]
int Message(string msg)
```

An annotation called NoRecordingForUndo, indicates that a function, statement or objects (e.g., function) assigned this attribute is considered to be outside of any TryAll context. In particular, any program state changes performed by the annotated instructions should not be reversed Any function with this attribute is not supposed to modify any data they do not own. In one example, if a function assigned the NoRecordingForUndo attribute modifies other data touched elsewhere in a TryAll block, the results are undefined. Thus, it is recommended that a programmer that uses this attribute, maintain whatever information associated with this attribute in a separate memory pool. Only functions marked with the NoRecordingForUndo attribute should touch the separate memory pool. Thus, in the Table G example, the attribute signals to the compiler not to revert the messages sent by the message statement even when the message statement is within a TryAll block.

Exemplary Recording Mechanism

In one example, undo (e.g., reversion) is supported by recording changes made within TryAll blocks. Another possible example would be to save a copy of the program's program state upon entering a TryAll block, but this is likely to be more costly.

In one such example, the code is modified to record existing state before it is changed.

Figure 3:
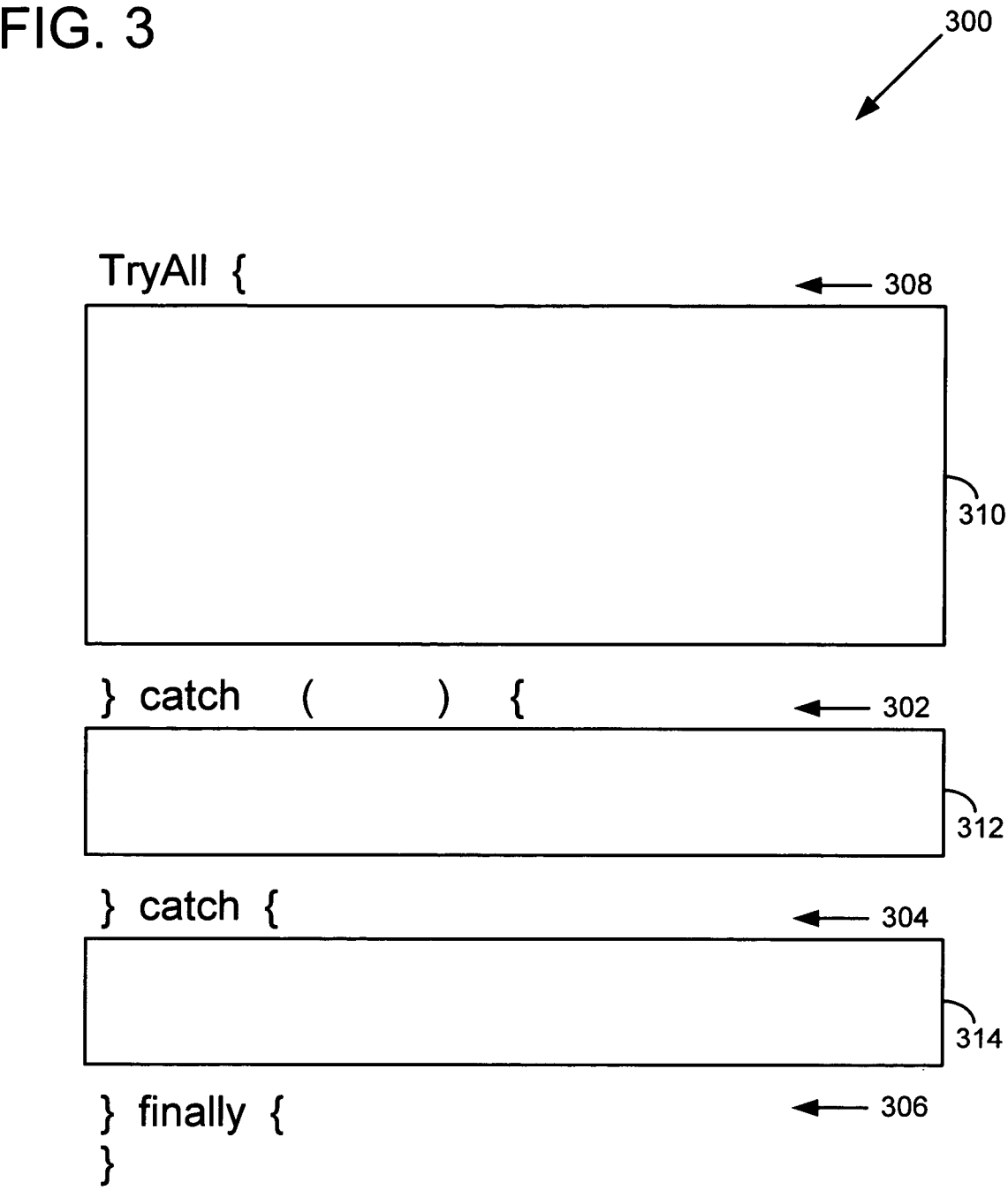
FIG. 3 is an exemplary program listing with code modified to record and revert program state changes.

FIG. 3 is an exemplary program listing with code indicating use of potential program state reversal. As shown, the program listing includes standard C# catch handlers 302, 304, a finally handler 306, and an exemplary TryAll 308 statement directing the compiler to program state changes in a TryAll block 310 for potential program state reversal. The code segments used in this document are similar to the common intermediate language (CIL) constructs (see e.g., The Common Language Infrastructure (CIL) Partition III: CIL Instruction Set, ECMA TC39/TG3, Final Draft, October 2002), but the technology is contemplated for any programming language.

Figure 4:
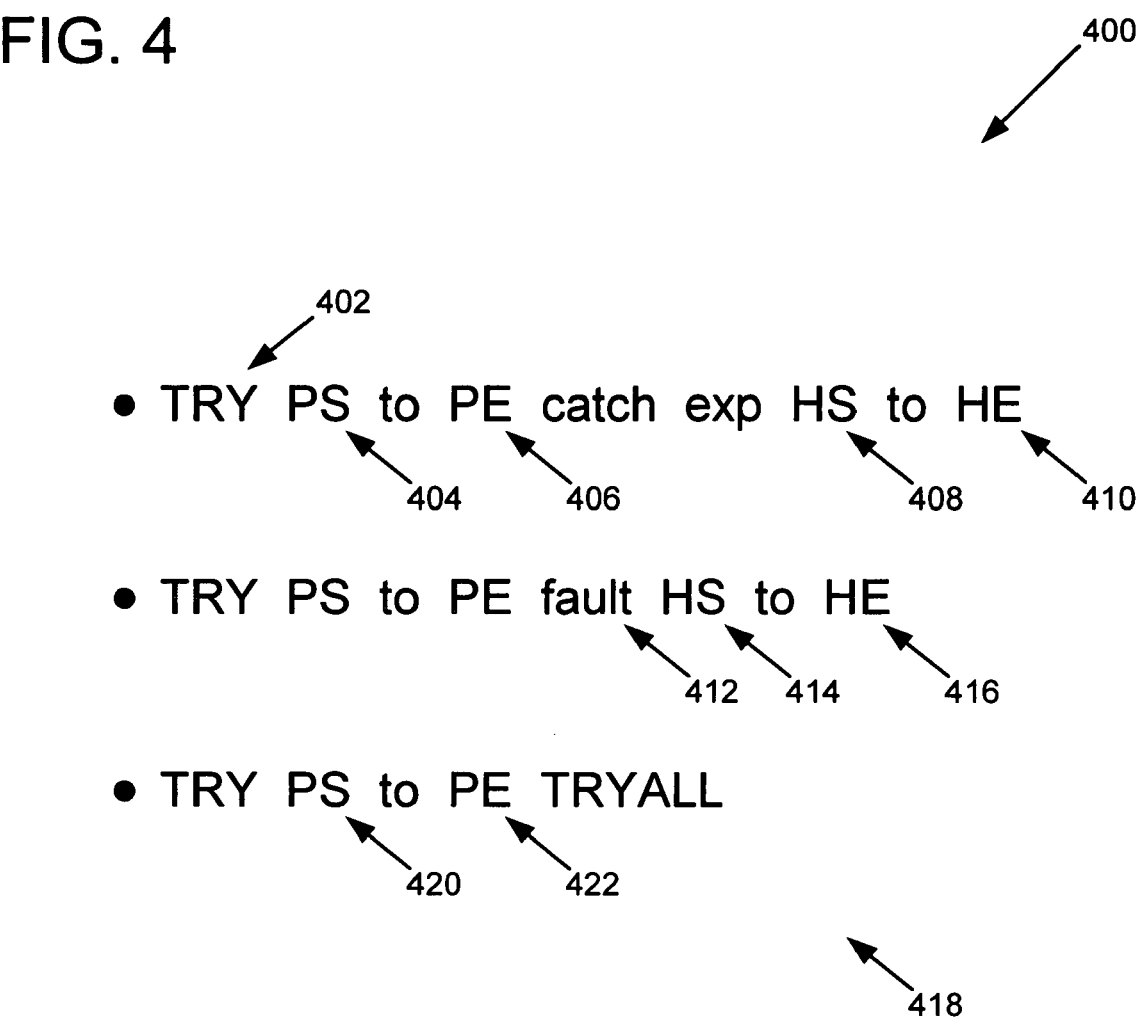
FIG. 4 is an exemplary listing of common intermediate language code with programming ranges.

FIG. 4 is an exemplary listing of common intermediate language code with programming ranges. For example, the first CIL statement describes that for a given "try" statement 402, if an exception is thrown in the range of program start 404 to program end 406, then the catch exception is directed to the handler existing between start 408 and end 410. Thus, this is an alternative way of representing try-catch-handling at the byte code level. Thus, statement 402 is an alternative way to represent default catch handling. For example, if an exception is thrown from a try statement and the thrown exception object does not have a handler, then a fault handler is run 412-416.

In one example, a compiler that translates from CIL to executable code is modified with a TryAll language construct to indicate that if an exception is thrown in a TryAll block (FIG. 3, item 310) 420-422 that a TryAll handler is run. Thus, in one example the described TryAll-Undo functionality is provided via an exception handling mechanism in a compiler.

Returning to FIG. 3, for each instruction in the TryAll block that writes to memory or otherwise changes program state, the existing program state state is recorded before the change is made. Thus, a standard byte code representation of the TryAll block code is modified. For example, objects, functions, or statements (i.e., functions) that are lexically within a TryAll block are indicated as recording.

For example, when a compiler determines that there is a TryAll associated with a region, the region is traversed to determine entry and exit points.

Figure 5:
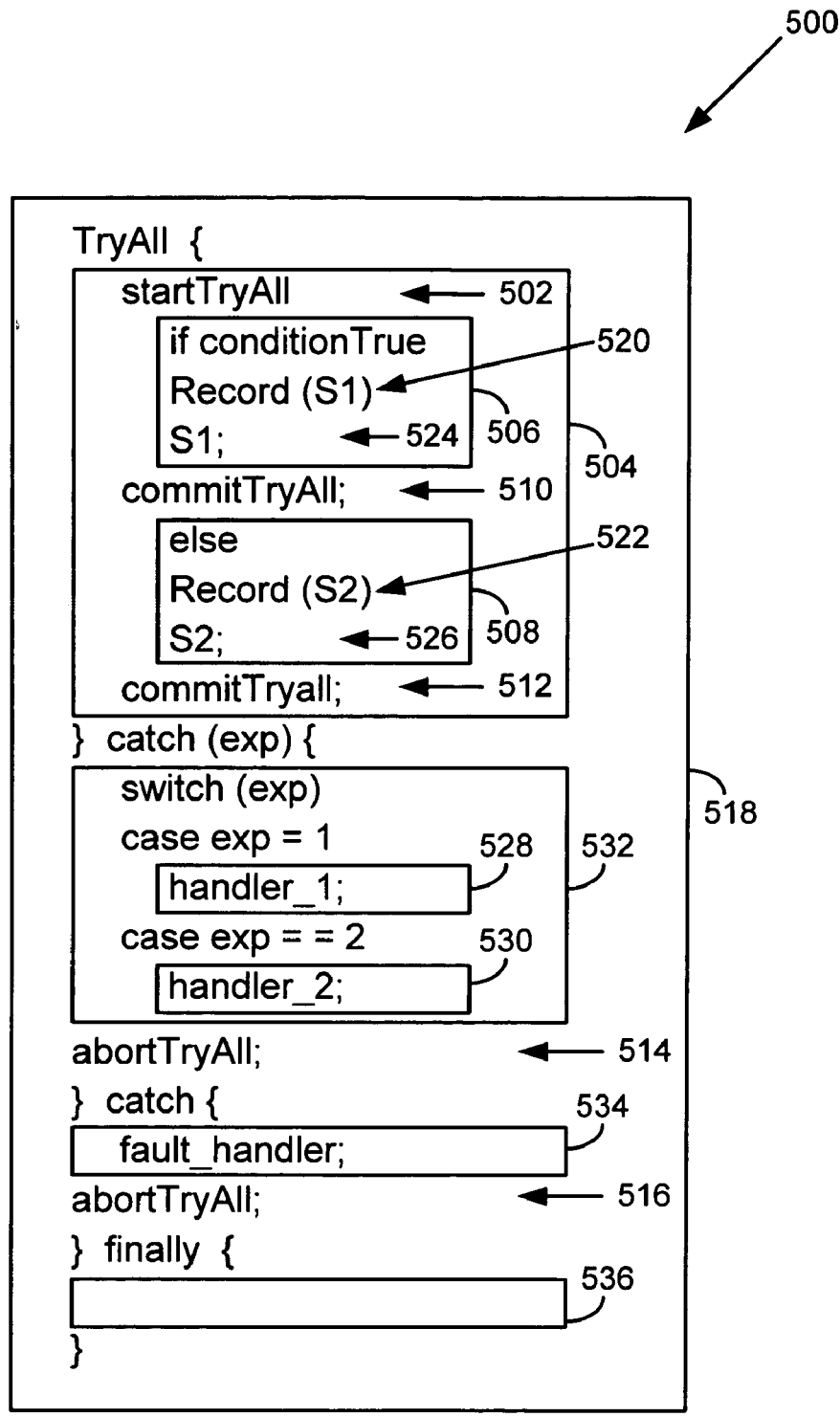
FIG. 5 is an exemplary program listing of instrumented program state reversion signal instructions.

FIG. 5 is an exemplary program listing of program state reversion signal instructions. In this example, a start TryAll token 502 signals to record state changed by statements in the TryAll block 504. In this example, the compiler traverses the TryAll block and identifies basic blocks 506-508. A basic block is a series of instructions that, upon entry, is executed until a first possible exit. For example, if series of sequential instructions ends with a jump or a call, then this indicates the end of a basic block. The compiler places a commitTryAll token at the end of each basic block exiting the TryAll context 510, 512. These commitTryAll statements indicate that the undo will not be necessary since the program TryAll block has exited gracefully (i.e., without exception).

The compiler also places abortTryAll statements after any basic blocks where the program exits via an exception handler 514, 516. In this example, the abortTryAll functionality is called to revert program state after the exception handling code is run, however this is not required in other examples.

Thus, before leaving the scope of a TryAll block, you are either exiting gracefully and calling a commitTryAll, or exiting after error handling and calling abortTryAll to revert program state.

Additionally, for each instruction in the TryAll context that alters program state, a record statement is inserted 520, 522 to save the pre-changed context. Statements within the basic blocks that change program state are identified 524, 526. Then record functions are inserted 520, 522 to record existing state in case an undo is later indicated. The commitTryAll and abortTryAll function calls indicate when to leave changes alone 512, 510, or when to abort changes 514, 516 and revert to the recorded program state values.

In one example, a programmer writes exception handling code that executes upon receiving an exception from the TryAll context 504. In one such example, the handler provides 528, 530 behavior desired by the programmer and then the abortTryAll statement is called to revert recorded changes to program state 514. However, there are examples where it would be desirable to propagate exception information up beyond the handlers 532, 534. Additionally, there are examples where the handling code 532, 534 itself throws an exception. Thus, a TryAll block 518 can be wrapped with another Try block that catches an exception throw by the nested TryAll block. The instructions in the finally block 536, are executed whether the TryAll block terminates normally or with an exception.

Figure 6:
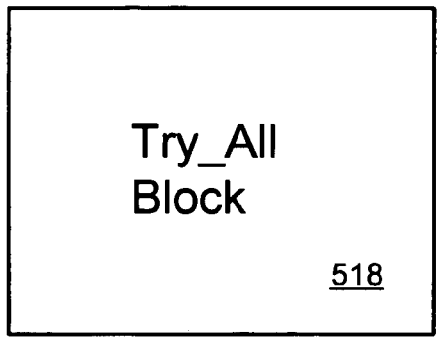
FIG. 6 is an exemplary program listing of a nested TryAll block.

FIG. 6 is an exemplary program listing of a nested TryAll block. In this example, if a nested handler 518 creates or throws an exception, the outer TryAll block catches 602 the exception. In this example, since calling a TryAllAbort 604 on the nested TryAll block 518 will revert the program state and therefore the information about the exception originating from the TryAll block, a clone 606 is created for the exception before program state reversion. Once the clone is created, the reversion is invoked 604 and then the cloned exception is propagated 608 up if desired.

Figure 7:
FIG. 7 is a program listing of an exemplary cloneForUndo method.

FIG. 7 is a program listing of an exemplary cloneForUndo method 700. As shown, the internalCloneForUndo method 702 is assigned a NoRecordingForUndo attribute 704. This attribute 704 allows cloning the exception in an area of memory that will not be reverted. Thus, the cloned exception remains after program state reversion in the specific area of memory designed for the NoRecordingForUndo attribute. A programmer can override the cloneForUndo method 706.

The programmer nests within a TryAll block, a statement or multiple statements that they want to undo if an exception is thrown. Optionally, if desirable, the programmer can also design an exception class for expected exceptions and handlers for handling the expected exceptions. The compiler examines the statements in the TryAll block 504 and inserts recording statements so old values are saved before changes are made to program state. Additionally, the compiler inserts commitTryAll statements and abortTryAll statements. These statements indicate whether to undo and revert to recorded program state (e.g., abortTryAll) or to keep the changed state and potentially discard recorded program state changes (e.g., commitTryAll). Next, an exemplary runtime will be discussed for supporting the undos and commits.

Exemplary Recording Runtime

Within a TryAll block, changes to program state are recorded in case they are later required in performing an undo. In one example, an area of memory lists the prechanged program state so it can be recovered. In one example, this recording is performed by inserting record( ) function calls before statements changing state. When an abortTryAll function call is received, the recorded state is used to return the executing program to a pre-TryAll state.

In another example, several data structures are used to store changed program state, where the data structure selected to store state is based on the type of state being stored. Thus, plural arrays pointing to a list of objects of certain types is used for efficiency.

Table H is an exemplary program listing of a C# structure used to store an object reference type.

TABLE H

```
struct logRef {
    object obj;
    int offset;
    object data;
}
```

Table I is an exemplary program listing of a C# structure used to store a value type.

TABLE I

```
struct logVal {
    object obj;
    int offset;
    int data;
}
```

Thus, when a change occurs to a program state, instead of just storing the memory location, a reference to the object itself is stored (e.g., "obj" in both Table H and Table I) along with an offset into the object where the change was made. If the change is made to a data value, the old value is stored in a logVal struct as data (e.g., "int data" in Table I). If the data was a reference to another object, it is stored in a logRef struct as a reference to an object (e.g., "object data" in Table H).

Distinguishing between object reference types and value types is helpful when garbage collection is used to support memory management. If a specific runtime uses a copying garbage collector, the runtime can change where objects are located on the heap. The garbage collector automatically updates object references to the moved objects. Thus, these structs distinguish which memory updates are made to object references, so this information in the recorded state data structures can also be automatically updated during garbage collection.

In one example, a memory management garbage collector is modified to manage the recorded state data structures and the memory. Since the garbage collector moves or otherwise manages objects on the heap, the object reference structures help distinguish the contents of the heap. In one example, the recorded state data structures are just other objects in memory and the garbage collector uses this information to manage the recorded state data structures. Thus, in one example, no special handling is needed for the recorded state data structures as opposed to other program objects.

Table J is a list of four types of linked lists of arrays created to save program state for undo functionality.

TABLE J

| data type | memory |
|---|---|
| value | heap |
| value | non-heap |
| ref | heap |
| ref | non-heap |

The first linked list of arrays stores value types that are changed on the heap. The second linked list of arrays stores value data types changed in non-heap memory such as the stack or static data. The third linked list of arrays stores changes made to object references in the heap, and the fourth linked list of arrays stores changes made to object references in non-heap memory. Each linked list of arrays starts with one array, and when each array is filled, a new array is allocated, and the full array is added to the list. In one example, the functionality of each linked list of arrays is abstracted away, and an interface is provided to for functions recording state, determining the current location (i.e., the current "index" for a given linked list of arrays), and reverting program state (i.e., reverting state associated with a linked list of arrays back to a specific location where it was recorded).

As previously stated, it is desirable to identify object references for reasons of garbage collection efficiency. The heap versus non-heap distinction is also helpful for garbage collection efficiency. Since objects or data in non-heap memory is not moved by the garbage collector, they can be handled differently. A separate array can be used for the purpose, providing separate undo methods for each.

At compile time, the compiler determines whether a changed state is for memory located on the heap or non-heap and whether the change is for a value or an object reference. Then the original corresponding state is saved in the proper linked list of arrays (e.g., Table J). For example, changes made to the stack need to be distinguished from the heap since the stack's state is often more transient in nature than the heap state. If the compiler is unable to determine the location of the memory, the compiler may insert code that determines at runtime the location of the memory and the proper data structure to use.

Table K is an exemplary program listing indicating why it may be advantageous to record stack memory differently than heap memory.

TABLE K

```
f(...) {
    int j
    int*i = &j:
    *i = 5
}
TryAll {
    f(...)
    throw failure ( );
}
```

For example, in Table K when the failure is thrown, the program flow has already called and exited the function f stack frame. However, since the call to function f is in a TryAll block, the changes made to local variables i and j have been recorded in the non-heap arrays. Thus, when state is being reverted later, the stack-pointer is checked, and since the non-heap stored state change occurred at a point beyond the relevant stack pointer they can be ignored.

Exemplary Identification of Instructions

Instructions in the TryAll block that change program state are instrumented so that program state is recorded before program state changes are made. Thus, the compiler identifies instructions that change program state, and adds instructions that record the existing state before the changes are made. While traversing the statements in a TryAll block, a switch statement can be utilized to identify and/or categorize statements in the TryAll block that change program state. Statements in the TryAll block that can change program state have an associated recording statement used to record the changes for reversion purposes. As instructions that change state are identified, the switch statement indicates to the compiler, what instructions to insert into the TryAll block to record existing state before the changes are made.

For example, the instructions in the TryAll block are instrumented to record state changes so the recorded state changes are available to revert program state. In one example, the instructions that change state are listed in a data structure, and for each such instruction, a corresponding record instruction is inserted into the TryAll block to record the present state before it is changed.

Table L is an exemplary table identifying program statements that change state, and for switching on the identified program statements to identify instructions to insert into the TryAll block to record state before changes are made.

TABLE L

| Indentified Statements | Record functions |
|---|---|
| StoreObjectField; | SOFRecord( ); |
| GlobalAssign | GlobalRecord( ); |
| StackAssign | StackRecord( ); |
| Heap Assign | HeapRecord( ); |

For example, in response to encountering a program instruction that stores an object field reference (e.g., StoreObjectField instruction) in a TryAll block, the compiler inserts a SOFRecord statement in front of the StoreObjectField assignment. The corresponding recording functions records the old value of the location in a data structures. In one example, the data structure is a linked list of arrays that varies based on the type of the data being stored (e.g., a heap-value type, assuming this data was stored on the heap). Thus, Table L provides examples of the types of instructions that are identifiable as changing program state, and a corresponding record function for saving that type of program state. This method can be improved by only recording the first change made. After reversion, the program state should be returned to the pre-TryAll value, so only the old value needs to be stored, not subsequent changes. In one example, StackAssign is an instruction that assigns values on a stack such as a simple assignment to a local variable, or could be an indirect assignment to a local variable (e.g., via a reference parameter in C#). In another example, HeapAssign is an instruction providing an indirect assignment to a value in the heap (e.g., via a reference parameter in C#). These are examples, and the actual instructions identified and the corresponding recording functions will be language dependent.

Thus, the recording functions document state changes to the program in one or more data structures for recall during reversion when necessary. In one example, the data structures are provided via four linked links of arrays, and the elements of the four linked list of arrays are the structures that carry the information (e.g., Table H and Table I) about what has been modified and where it was modified. When an abortTryAll is called on a TryAll block, the recorded information is used to restore the state to the pre-TryAll state.

Exemplary TryAll Indices and Nesting

In one example, to start recording for undo at runtime, when a TryAll block is entered, a set of pointers into the four linked lists of arrays is noted. A TryAll-pointers data structure is provided for holding the set of pointers noted for each TryAll block when execution enters the TryAll block. Thus, the TryAll-pointers data structure holds the pointers into the four linked lists of arrays. Once execution exits a TryAll block as indicated by an encountered abortTryAll instruction, program state is reverted until the set of pointers in the TryAll-pointers data structure is reached. Contrarily, if a commitTryAll instruction is encountered, then the recorded program state no longer needs to be restored, and the recorded state can be discarded from the four linked lists of arrays all the way up to the point of the set of pointers noted for that TryAll block. However, if a committing TryAll block is nested within another TryAll block, then the recorded data is maintained in the four linked lists of arrays. Later if that outer TryAll block is aborted, the data is available to the outer TryAll block to revert program state. Since an arbitrary program can include many TryAll blocks, the indices indicate for a given abortTryAll function call, where to stop reversion, when an abortTryAll instruction is encountered.

Thus, the four linked lists of arrays are global, and a TryAll block is assigned indices where program state recording begins for the TryAll block. When a TryAll block commits, the committing TryAll block is discarded, but the TryAll block it is nested within still has all the data recorded therein. Then if the outer TryAll block aborts, even data in the inner TryAll is reverted.

This makes commitTryAll statements run very fast, and since only the abortTryAll functions revert program state, the program runs fast in the usual case when the program commits.

If a TryAll block is nested within another TryAll block when its commits, the recorded program state remains in case the outer TryAll block aborts. TryAll blocks that have been entered and recorded in the TryAll-pointers data structure but are not yet exited (whether commit or abort) are said to be in a "TryAll session." Thus, as TryAll blocks commit, they are popped off of the TryAll-pointers data structure TryAll session which happens very rapidly. Any outer TryAll blocks remain on the TryAll-pointers data structure while they remain in a TryAll session.

Exemplary Recording Functions

A problem occurs when a function is called from within a TryAll block. In such an example, any changes made by that function need to be recorded for reversion in case the TryAll block reverts.

In one example, a function is cloned. For example, a function "f ( )" is cloned and given the name "f.record( )". The cloned version is modified so that any state changes made by the function are recorded in the four linked lists of arrays.

By creating a recording version of functions called directly or indirectly from the TryAll block, the f.record function assures that during a reversion, all state changes caused by the called function are reverted. Also, the f.record version of the function is now available to record changes made to state if "f" is called from anywhere else in the program. Additionally, the original function f is still available without modification to run whenever f is not called directly or indirectly from TryAll block. Thus, the program runs unaffected whenever f is called from somewhere not in the TryAll block.

Exemplary Virtual Recording Functions

For virtual functions, new recording versions of those functions are created for program state reversion. Additionally, calls to virtual functions from within a TryAll block are changed to call the recording version of the function. Further, if a function is overridden anywhere, then in one example, anything that overrides the function is cloned and the cloned version is instrumented with recording.

Figure 8:
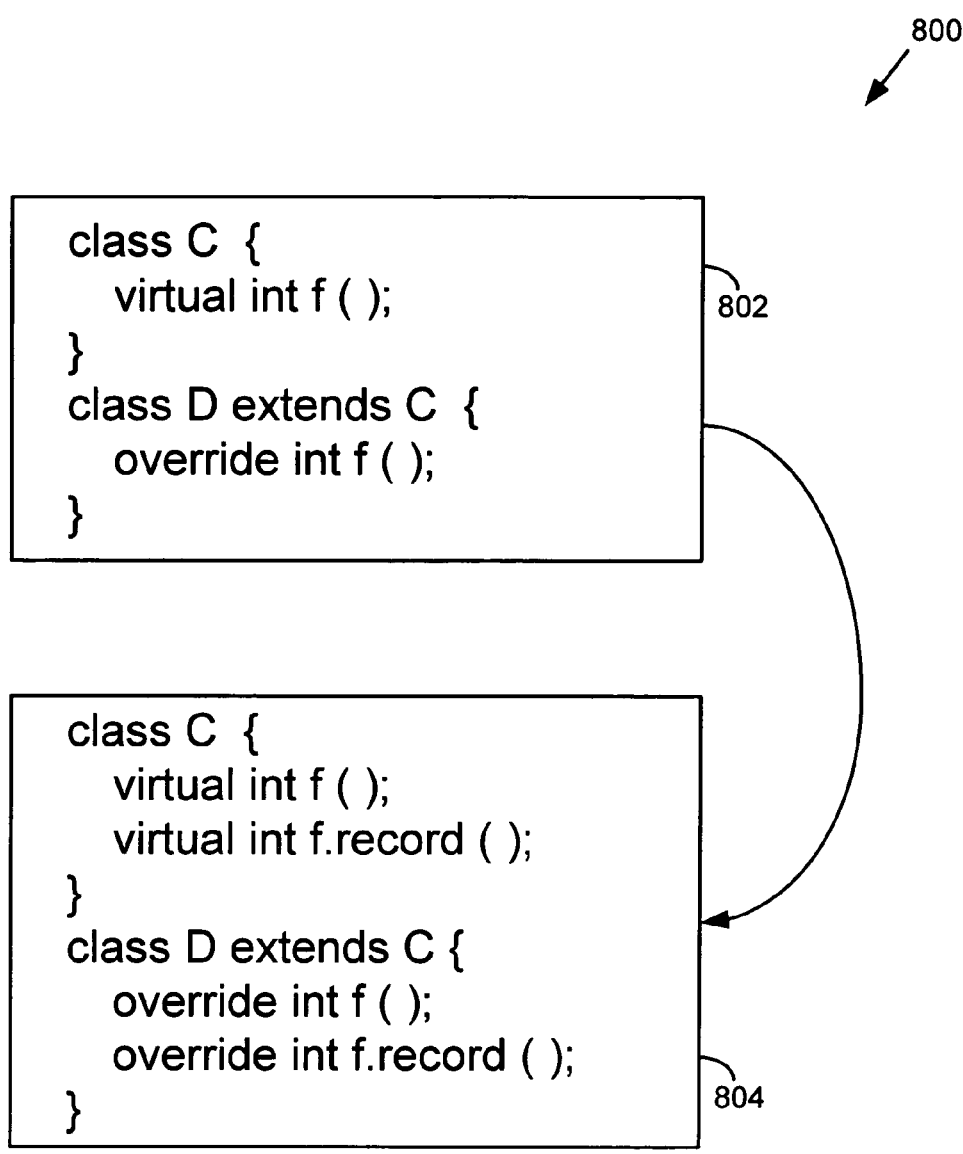
FIG. 8 is a program listing of an exemplary virtual function.

FIG. 8 is a program listing of an exemplary virtual function. For example, given a Class C and a Class D that extends C, if function f( ) is called in a TryAll block, then an f.record function is created for recording purposes. Additionally, since function f is overridden in class D, a recording version of D's version of f is created for recording.

Thus, the compiler transitively traverses the program and creates recording versions of functions for any function called directly or indirectly from the TryAll block, so this information is recorded for a possible abortTryAll function call.

In one example, the recording versions of functions are only created when they are called directly or indirectly from a TryAll block.

Exemplary Local Variables

Assignments to local variables in a function that has been cloned are not recorded unless they are part of a TryAll block within the cloned function itself. However, if they are local variables defined before the TryAll block, then they are recorded.

Exemplary Undo Actions

When an undoAction is registered, an undo action array is created to store information about when to call undo on the registered object.

Table M is a program listing of an exemplary structure for storing information about a registered undo object. As discussed earlier, a programmer can register objects for self reverting. During an Undo program state reversion, the compiler will call the programmer supplied undo method on the registered object. The Undo method is called once the reversion has returned to the state just before the undo registration.

TABLE M

```
struct UndoAction {
    [int, int] arraylist 1;
    [int, int] arraylist 2;
    [int, int] arraylist 3;
    [int, int] arraylist 4;
    Iundo undo;
}
```

Thus, in Table M, an index is stored into each of the four linked lists of arrays. As shown, an index into one of the linked lists of arrays is represented by two integers. The first integer indicates which array in the linked list, and the second integer indicates which element within that array. Once program state has reverted to the point of these four indices, then the Undo method is called on the registered object.

Exemplary Computing Environment

Figure 9:
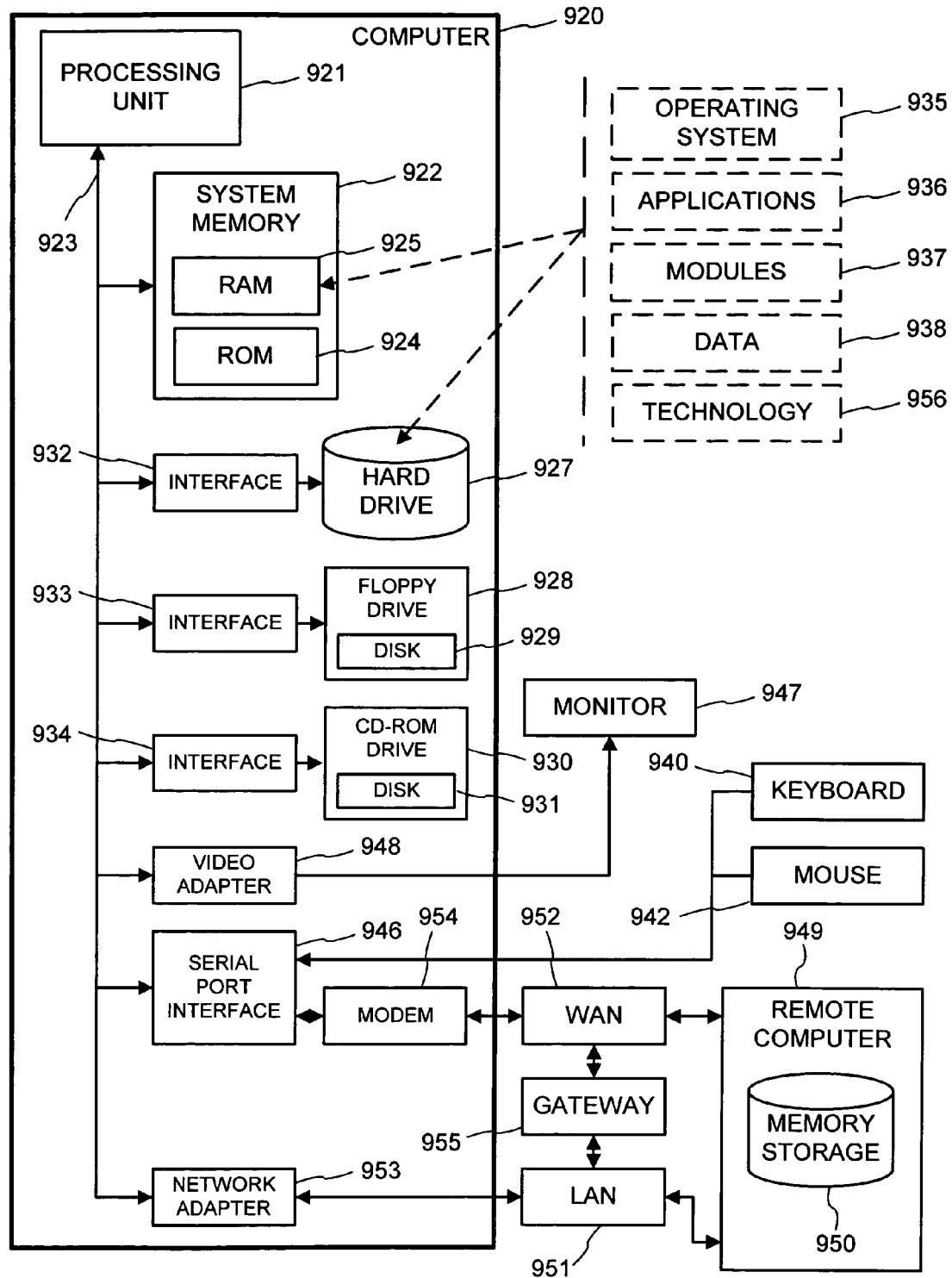
FIG. 9 is a block diagram of a distributed computer system implementing the described technologies.

FIG. 9 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that performs particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 9, an exemplary system for implementation includes a conventional computer 920 (such as personal computers, laptops, servers, mainframes, and other variety computers) includes a processing unit 921, a system memory 922, and a system bus 923 that couples various system components including the system memory to the processing unit 921. The processing unit may be any of various commercially available processors, including Intel® x86, Pentium® and compatible microprocessors from Intel® and others, including Cyrix®, AMD™ and Nexgen™; Alpha from Digital Equipment Corp.; MIPS® from MIPS Technology®, NEC®, IDT™, Siemens®, and others; and the PowerPC® from IBM® and Motorola®. Dual microprocessors and other multi-processor architectures also can be used as the processing unit 921.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 924 and random access memory (RAM) 925. A basic input/output system (BIOS), containing the basic routines that help to transfer information between elements within the computer 920, such as during start-up, is stored in ROM 924.

The computer 920 further includes a hard disk drive 927, a magnetic disk drive 928, e.g., to read from or write to a removable disk 929, and an optical disk drive 930, e.g., for reading a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions, etc. for the computer 920. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 925, including an operating system 935, one or more application programs 936, other program modules 937, and program data 938; in addition to an implementation of the described methods and systems of providing memory reversion 956.

A user may enter commands and information into the computer 920 through a keyboard 940 and pointing device, such as a mouse 942. These and other input devices are often connected to the processing unit 921 through a serial port interface 946 that is coupled to the system bus, but may be connected by other interfaces, such as a parallel port, game port or a universal serial bus (USB). A monitor 947 or other type of display device is also connected to the system bus 923 via an interface, such as a video adapter 948. In addition to the monitor, computers typically include other peripheral output devices (not shown), such as speakers and printers.

The computer 920 operates in a networked environment using logical connections to one or more remote computers, such as a remote computer 949. The remote computer 949 may be a server, a router, a peer device or other common network node, and typically includes many or all of the elements described relative to the computer 920, although only a memory storage device 950 has been illustrated. The logical connections depicted include a local area network (LAN) 951 and a wide area network (WAN) 952. Such networking environments are commonplace in offices, enterprise-wide computer networks, intranets and the Internet.

When used in a LAN networking environment, the computer 920 is connected to the local network 951 through a network interface or adapter 953. When used in a WAN networking environment, the computer 920 typically includes a modem 954 or other means for establishing communications (e.g., via the LAN 951 and a gateway or proxy server 955) over the wide area network 952, such as the Internet. The modem 954, which may be internal or external, is connected to the system bus 923 via the serial port interface 946. In a networked environment, program modules depicted relative to the computer 920, or portions thereof, may be stored in the remote memory storage device. It will be appreciated that the network connections shown are exemplary and other means of establishing a communications link between the computing devices may be used, wireless or otherwise.

Alternatives

Having described and illustrated the principles of our invention with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. A computerized method comprising:
providing language constructs to applications programmers comprising program state reversion constructs;
receiving, in a computer, a representation of a program having one or more program state reversion constructs comprising a reversion indication construct indicating a series of instructions to revert, wherein the series of instructions to revert comprises less than all of the instructions in a method;
inserting code into the program comprising:
code for recording program state before modifications are made by the series of instructions indicated by the reversion indication construct, and saving the program state in one or more data structures, and
code for reverting program state to the recorded program state when an exception arises from the series of instructions indicated by the reversion indication construct; and
executing the program and inserted code comprising:
recording program state in the one or more data structures prior to executing the series of instructions indicated by the reversion indication construct, wherein the one or more data structures comprises a first linked list saving program state for value types that are changed in heap memory, a second linked list saving program state for value types that are changed in non-heap memory, a third linked list saving program state for object references that are changed in heap memory and a fourth linked list for saving program state for object references that are changed in non-heap memory; and
upon generating an exception while executing the series of instructions indicated by the reversion indication construct, reverting program state according to the recorded program state.

2. The method of claim 1 wherein the recording of the program state prior to executing the series of instructions is performed during the execution of the series of instructions by recording partial program state modified by an instruction prior to executing the instruction.

3. The method of claim 1 wherein the program state reversion constructs further comprise a reversion registration construct indicating a registration of a reversion method.

4. The method of claim 3 wherein inserting code into the program further comprises inserting code that calls the reversion method when program state reversion has reverted to a state immediately preceding the reversion registration construct.

5. The method of claim 3 wherein the reversion method is implemented by a non-memory managed resource.

6. The method of claim 5, wherein the non-memory managed resource supports the reversion method via an Iundo interface.

7. The method of claim 3, wherein the reversion method is called on a system resource so the method reverts both program state and system state.

8. The method of claim 1 wherein the code insertion is performed by a modified compiler and memory reversion is performed by an automatic memory manager.

9. The method of claim 1 wherein the reversion indication construct is a TryAll block, and program state is reverted to a pre-TryAll block state.

10. The method of claim 9, wherein the program state reversion occurs when an exception is thrown from the series of instructions in the TryAll block.

11. The method of claim 1 wherein the exception is cloned before program state reversion and the cloned exception is propagated upon program state reversion.

12. The method of claim 1, wherein a no recording annotation is indicated for an instruction in the series of instructions, and when program state reversion occurs, program state modifications made by the instruction with the no recording annotation are not reverted.

13. The method of claim 12, wherein information associated with the instruction with the no recording annotation is maintained in a memory pool separate from instructions not associated with a no recording annotation.

14. The method of claim 1 wherein the representation of the program further comprises a handler written by an applications programmer, and executing the program further comprises executing the handler after the exception is thrown but before program state is reverted.

15. The method of claim 1, wherein, when an exception is thrown in an instruction in the series of instructions, remaining instructions are run prior to reversion.

16. The method of claim 1 wherein at least one program state reversion construct is nested within at least one other program state reversion construct.

17. A computer-readable storage medium having stored thereon computer-executable instructions for performing a method comprising:
   receiving, in a computer, a representation of a program having one or more program state reversion constructs comprising a reversion indication construct indicating a series of instructions to revert, wherein the series of instructions to revert comprises less than all of the instructions in a method;
   inserting code into the program comprising:
      code for recording program state before modifications are made by the series of instructions indicated by the reversion indication construct, and saving the program state in one or more data structures, and
      code for reverting program state to the recorded program state when an exception arises from the series of instructions indicated by the reversion indication construct; and
   executing the program and inserted code comprising:
      recording program state in the one or more data structures prior to executing the series of instructions indicated by the reversion indication construct, wherein the one or more data structures comprises a first linked list saving program state for value types that are changed in heap memory, a second linked list saving program state for value types that are changed in non-heap memory, a third linked list saving program state for object references that are changed in heap memory and a fourth linked list for saving program state for object references that are changed in non-heap memory; and
      upon generating an exception while executing the series of instructions indicated by the reversion indication construct, reverting program state according to the recorded program state.

18. A computer system comprising:
   computer memory and a central processing unit;
   a program comprising instructions and a reversion indicator identifying plural revertible instructions, wherein the plural revertible instructions comprises less than all of the instructions in a method;
   a compiler for modifying the program to record program state modifications made by the plural revertible instructions;
   a program state-modification data structure storing modifications to a stack made by the plural revertible instructions, the data structure comprising a first linked list saving program state for value types that are changed in heap memory, a second linked list saving program state for value types that are changed in non-heap memory, a third linked list saving program state for object references that are changed in hear memory and a fourth linked list for saving program state for object references that are changed in non-heap memory; and
   reversion logic for restoring the program state to state of program prior to execution of the reversion indicator according to the program state-modification data structure, upon receiving an exception thrown while executing the plural revertible instructions.

19. The computer system of claim 18 wherein an applications programmer writes a handler to execute when the exception is thrown, and the reversion logic runs the handler before restoring the program state.

20. A computer-readable medium having thereon computer-executable instructions for performing a method comprising:
   providing language constructs comprising program state reversion constructs;
   receiving a representation of a program having one or more program state reversion constructs comprising a reversion indication construct indicating a series of instructions to revert;
   inserting code into the program comprising:
   code for recording program state before modifications are made by the series of instructions indicated by the reversion indication construct, and
   code for reverting program state to recorded values when an exception arises from the series of instructions indicated by the reversion indication construct; and
   executing the program and inserted code comprising:
      recording program state prior to executing the series of instructions indicated by the reversion indication construct in a data structure indicated for stack modifications, the data structure comprising a first linked list saving program state for value types that are changed in heap memory, a second linked list saving program state for value types that are changed in non-heap memory, a third linked list saving program state for object references that are changed in heap memory and a fourth linked list for saving program state for object references that are changed in non-heap memory, and
      upon generating an exception while executing the series of instructions indicated by the reversion indication construct, reverting program state according to the recorded program state.

21. The computer-readable medium of claim 20, wherein the received representation of the program has plural nested program state reversion constructs each indicating a series of instructions to revert.

22. The computer-readable medium of claim 20, wherein the recording program state only records only a first state change.

* * * * *

UNITED STATES PATENT AND TRADEMARK OFFICE
CERTIFICATE OF CORRECTION

PATENT NO. : 7,607,125 B2
APPLICATION NO. : 10/985353
DATED : October 20, 2009
INVENTOR(S) : Shinnar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 840 days.

Signed and Sealed this

Twelfth Day of October, 2010

David J. Kappos
*Director of the United States Patent and Trademark Office*